UNITED STATES PATENT OFFICE.

THOMAS P. HALL, OF PORTSMOUTH, ASSIGNOR TO WILLIAM BULL, OF SOUTHSEA, ENGLAND.

IMPROVEMENT IN THE MANUFACTURE OF ARTIFICIAL STONE.

Specification forming part of Letters Patent No. 213,107, dated March 11, 1879; application filed June 10, 1878; patented in England, October 25, 1876.

*To all whom it may concern:*

Be it known that I, THOMAS PARSON HALL, of Portsmouth, in the county of Hants, England, inspector of public works, have invented certain new and useful Improvements in the Manufacture of Artificial Stone for paving, building, and other purposes, which improvements are fully set forth in the following specification.

According to my invention I cast slabs, paving quarries or tiles, landings, steps, sills, arch-stones, coping-caps, sewer-blocks, curbing, channeling-troughs, and any other articles for which stone can be employed; and for this purpose I use the best Portland cement (or it may be other good hydraulic cement or lime) ground to an extremely fine powder, in combination with more or less (according to the required quality) of sharp sand, broken clinkers, stone flints, shingle, gravel, or other hard materials, such as furnace-slag. These materials are incorporated with the slaked cement in the usual and generally well-understood manner. To this I add the following preparation to form an outer coating, or to be incorporated therewith, viz: Portland cement, or other good hydraulic cement or lime is mixed with iron or steel turnings, borings, or filings, either wrought or cast, or with oxide of iron, provided it be tolerably free from earthy matter. The iron or steel or oxide of iron is disintegrated into very small particles and thoroughly incorporated with the cement. The mixture is then slightly but thoroughly wetted and placed in the mold before any of the cement is set. It is then, while still in the mold, submitted to great pressure by hydraulic or other means, and in undergoing this process the material is consolidated into one very dense mass, much less porous than ordinary cement.

After the material has been removed from the mold and exposed for some time to the air it is immersed in a bath of dilute sulphuric acid, which dissolves a portion of the iron and impregnates the body of the material with the solution, filling its pores with insoluble sulphates, and rendering it harder and more durable than any natural stone.

In constructing sea-walls, docks, barn, or other floors, platforms, piers, wharves, or any other walls or pavements which do not require to be frequently removed, I either lay the slabs of artificial stone prepared as above described, and joint them with a mixture of hydraulic cement or lime and finely-disintegrated iron or oxide of iron, and then wash the joints with dilute sulphuric acid, thus producing a uniform surface throughout, or I cover the wall, floor, or platform with the mixture of cement or lime and iron or steel or oxide of iron in the wet or damp state, and when the cement has partially hardened I wash the whole with dilute sulphuric acid, thus covering the entire surface with a perfectly homogeneous stone entirely free from joints.

The introduction of finely-disintegrated iron in the metallic form has the advantage of preventing the slipperiness so often complained of in most paving materials, especially when wetted, while it does not sensibly roughen the surface.

Artificial stone produced according to this invention is known as "ferrumite."

I am aware that sulphuric acid and metallic salts have been used for the purpose of coloring stones made by other methods.

I am also aware that fine particles of iron or steel have been combined with sand, gravel, or cement.

I claim as my invention—

The method herein specified of manufacturing artificial stone, consisting in mixing particles of iron with sand and cement or similar material and molding the same to shape, and then immersing the block in dilute sulphuric acid, substantially as and for the purposes set forth.

Signed by me this 24th day of May, 1878.

T. P. HALL.

Witnesses:
W. STOAKES,
 158 *Lake Road, Landport, Portsmouth, gentleman.*
WM. P. FOORD,
 18 *St. Paul's Square, Southsea, gentleman.*